(12) United States Patent
Choudhury et al.

(10) Patent No.: US 11,501,277 B2
(45) Date of Patent: Nov. 15, 2022

(54) CONTEXTUAL PAYMENT AND ACCOUNT MANAGEMENT INFRASTRUCTURE

(71) Applicant: VISA INTERNATIONAL SERVICE ASSOCIATION, San Francisco, CA (US)

(72) Inventors: Prithviraj Choudhury, Foster City, CA (US); Anup Tripathi, Foster City, CA (US); Shipra Jha, Foster City, CA (US); Claudia Wyatt, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/198,866

(22) Filed: Nov. 22, 2018

(65) Prior Publication Data
US 2020/0167755 A1 May 28, 2020

(51) Int. Cl.
*G06Q 20/22* (2012.01)
*G06Q 20/40* (2012.01)
*G06Q 20/32* (2012.01)
*G06F 9/451* (2018.01)
*G06F 3/0484* (2022.01)
*G06F 3/0481* (2022.01)

(52) U.S. Cl.
CPC ....... *G06Q 20/227* (2013.01); *G06Q 20/3223* (2013.01); *G06Q 20/4014* (2013.01); *G06F 3/0481* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 8,892,462 B1* | 11/2014 | Borovsky | ............ | G06Q 20/405 705/17 |
| 2011/0191149 A1* | 8/2011 | Blackhurst | ............. | G06Q 40/02 705/14.1 |
| 2012/0221420 A1* | 8/2012 | Ross | ...................... | G06Q 40/00 705/16 |
| 2012/0239417 A1* | 9/2012 | Pourfallah | ........... | G06Q 20/384 705/2 |

(Continued)

OTHER PUBLICATIONS

Benefit Wallet, Frequently Asked Questions: Direct Pay HSA (Year: 2014).*

*Primary Examiner* — David P Sharvin
*Assistant Examiner* — Brock E Turk
(74) *Attorney, Agent, or Firm* — Loeb & Loeb LLP

(57) ABSTRACT

A computerized method for providing an interactive graphical user interface (GUI) to a user on a display of a mobile device. The method interacts with the user to obtain information about a first payment account and a second payment account. The method aggregates parameters of the first payment account and the second payment account on a unified GUI on the mobile device. The method further monitors transactions of the first payment account and the second payment account. When a particular transaction conducted by the first payment account includes parameters associated with the second payment, the method identifies that particular transaction and presents a confirmation GUI screen to the user to confirm using the second payment account instead.

20 Claims, 20 Drawing Sheets

(56) References Cited

U.S. PATENT DOCUMENTS

| | | | | |
|---|---|---|---|---|
| 2013/0024371 A1* | 1/2013 | Hariramani | ......... | G06Q 20/384 |
| | | | | 705/41 |
| 2013/0073459 A1* | 3/2013 | Zacarias | ............... | G06Q 20/36 |
| | | | | 705/41 |
| 2014/0244514 A1* | 8/2014 | Rodriguez | ............ | G06Q 20/10 |
| | | | | 705/71 |
| 2014/0279474 A1* | 9/2014 | Evans | .................... | G06Q 20/40 |
| | | | | 705/41 |
| 2015/0193858 A1* | 7/2015 | Reed | ................ | G06Q 30/0633 |
| | | | | 705/26.8 |
| 2015/0348001 A1* | 12/2015 | Van Os | ............. | G06Q 20/3278 |
| | | | | 705/44 |
| 2016/0148317 A1* | 5/2016 | Benway | ................ | G06Q 40/08 |
| | | | | 705/2 |
| 2017/0193489 A1* | 7/2017 | Jeon | ..................... | H04B 5/0081 |
| 2017/0323292 A1* | 11/2017 | Agarwal | ............... | G06Q 20/20 |

* cited by examiner

FIG. 2

| DATE | DESCRIPTIONS | AMOUNT |
|---|---|---|
| 09/04/2018 | TRI-AD FSA DEPOSIT | $4.14 $12.42 |
| 10/15/2018 | TRI-AD FSA DEPOSIT | $4.56 $13.22 |
| 10/26/2018 | TRI-AD FSA DEPOSIT | $9.56 $10.22 |

FSA PREPAID ACCOUNT TRANSACTIONS

FIG. 5A

| DATE | DESCRIPTIONS | AMOUNT |
|---|---|---|
| | SECOND PAYMENT ACCOUNT | |
| 09/04/2018 | TRI-AD FSA DEPOSIT | $4.14 $12.42 |
| 10/15/2018 | TRI-AD FSA DEPOSIT | $4.56 $13.22 |
| 10/26/2018 | TRI-AD FSA DEPOSIT | $9.56 $10.22 |
| 11/01/2018 | TRI-AD FSA | $12.97 |

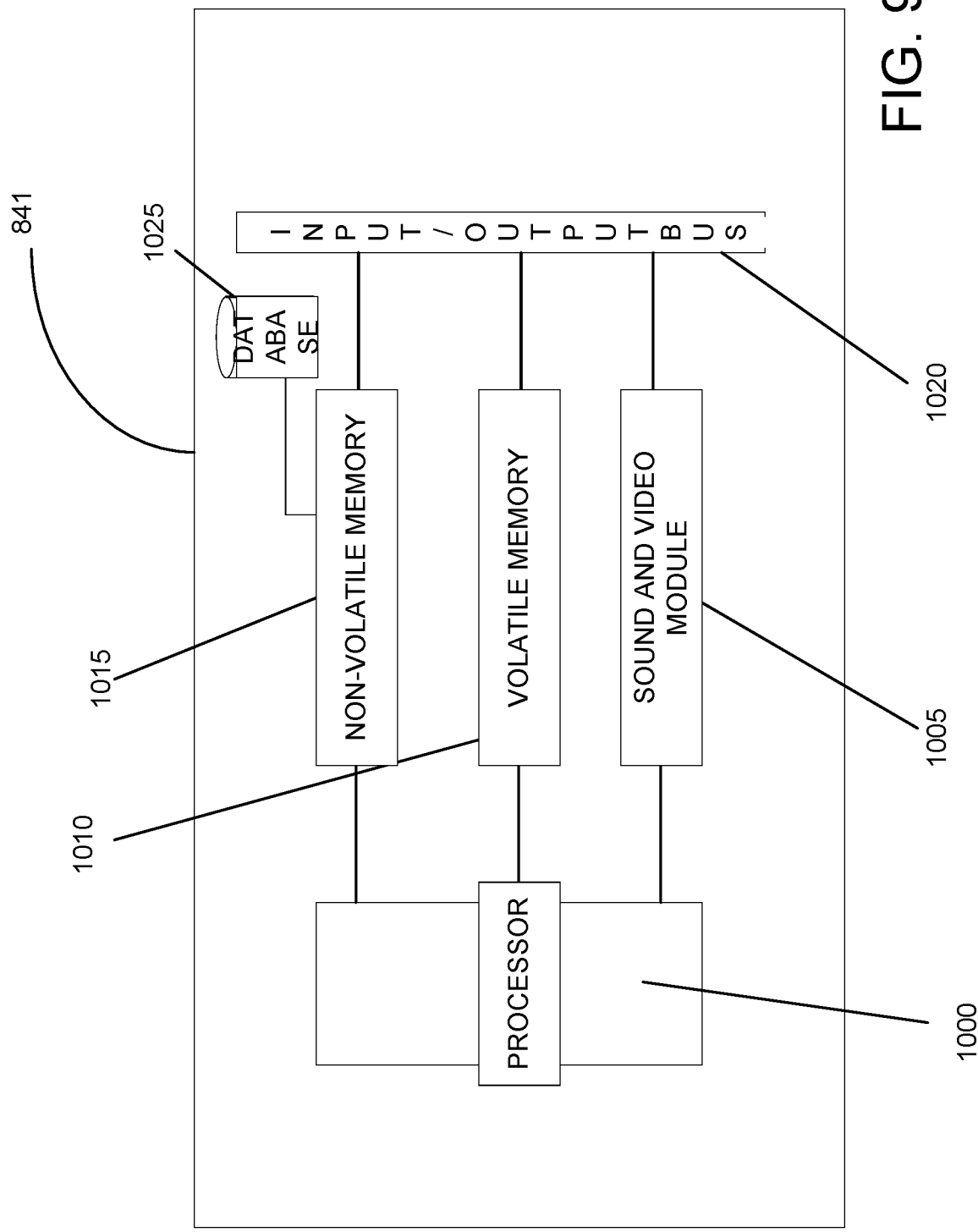

CONTEXTUAL PAYMENT AND ACCOUNT MANAGEMENT INFRASTRUCTURE

TECHNICAL FIELD

Embodiments discussed herein generally relate to providing a contextual payment infrastructure and account management platform.

BACKGROUND

End-users have to carry a different debit card and/or prepaid card for different type of benefit programs (e.g., Flexible Health Care spending, benefits offered by California Employment Development Department (EDD), etc.), in addition to their typical credit cards. Even with the convenience of a digital wallet or an app on a mobile device, carrying such physical cards continue to be a burden for the users. Moreover, disbursement allocations to these benefits programs continue to be a hassle to the users.

Furthermore, like many accounts that the users have to deal with, users need to separately log in to each of these benefits account in order to learn about the status of account balances. As such, unless a user preplans every purchase and has the time to login in to check on statuses of these different benefits programs, the user frequently run into situations such as not receiving the benefits he or she should have received. For example, in an embodiment, the user wishes to purchase a pair of orthotics and the item is on sale. In trying to purchase the item on sale, the user may be hurried in selecting and paying for the item at a merchant, whether it's an online store or in a physical store. After the payment, the user then realizes that the item qualifies for a certain benefits program, e.g., Flexible Spending Account (FSA). There is no point for the user to go back to the store and purchase it again, sometimes, as the item may not be available again (such as online sales), or the user may have already left the physical store and it is a hassle just to return the store to repurchase the item after going through returns, etc.

As such, existing systems possess a technical problem of having a convenient way for the user to review and view the current status of transactions across the payment accounts, including those accounts of the benefits program in real-time or substantially real-time. Furthermore, technical problems carry over to the consumer side where there are no software products that present a convenient user interface to utilize the infrastructure.

Therefore, embodiments attempt to solve or address one or more of the problems identified.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

FIG. 2 is a diagram illustrating another GUI on a mobile device according to one embodiment illustrated in FIG. 1.

FIGS. 5A and 5B are diagrams illustrating an updated transaction list in response to FIGS. 4A to 4D according to one embodiment.

FIG. 9 is a diagram illustrating a remote computing device according to one embodiment.

DETAILED DESCRIPTION

Embodiments may now be described more fully with reference to the accompanying drawings, which form a part hereof, and which show, by way of illustration, specific exemplary embodiments may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure will be thorough and complete, and will fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments may provide a contextual platform across payment accounts such that the user has an up-to-date view of the payment accounts. Moreover, embodiments may provide contextual payment notifications or alters alerts to the user such that the user may change or confirm charges or transactions at payment accounts when some of the transactions or purchases may be beneficial for the user to use benefits program cards due to the specific category of purchases.

Aspects or embodiments may provide a contextual payment platform and infrastructure to make payment with benefits programs convenient. Embodiments further build an infrastructure among benefits program managers, card issuers, banking institutions, payment acquirer and processors via application programming interface (API) such that use of the infrastructure may be seamless.

Figure 1A:
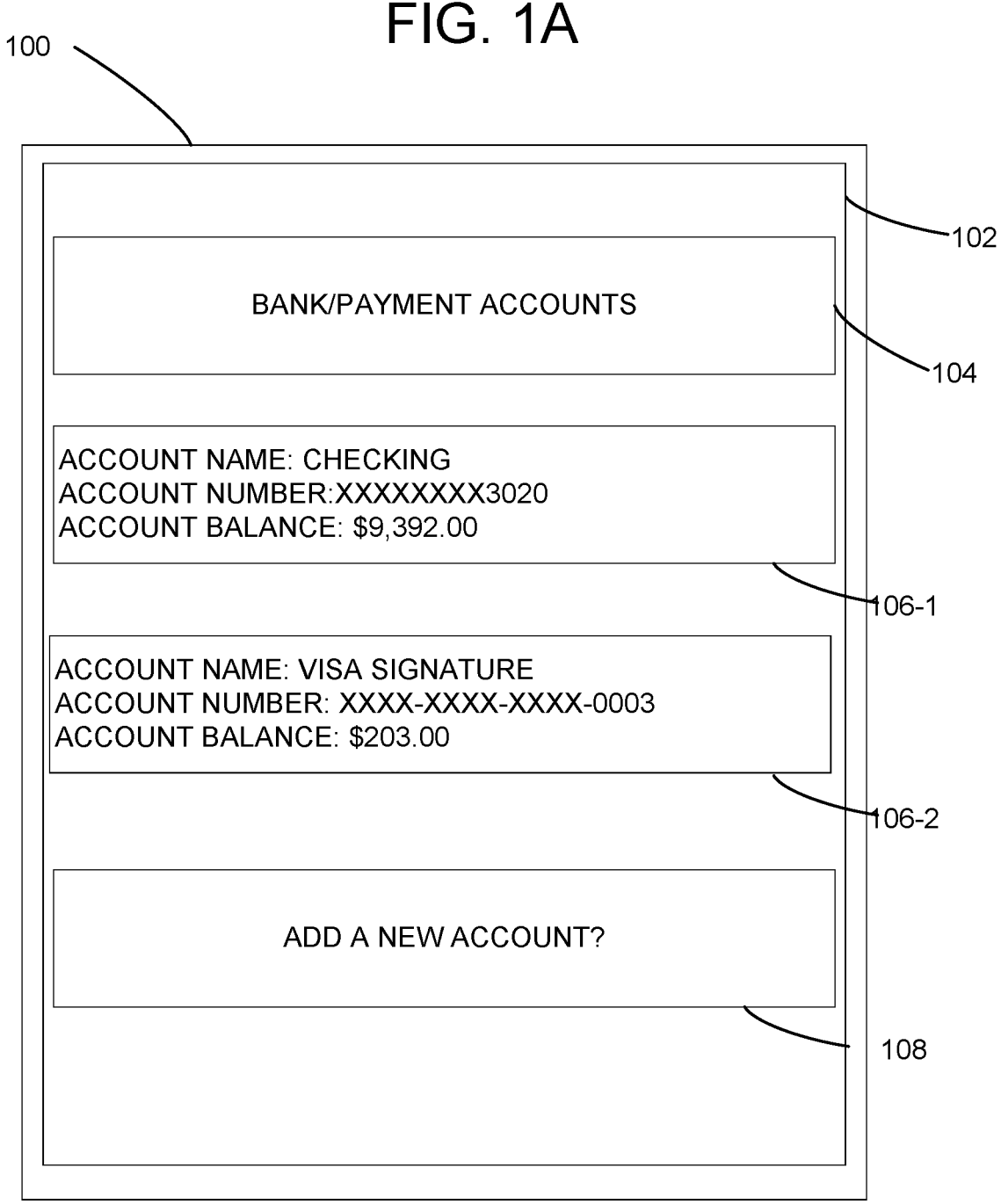
FIGS. 1A to 1F are diagrams illustrating a graphical user interface (GUI) on a mobile device according to one embodiment.
Figure 1B:
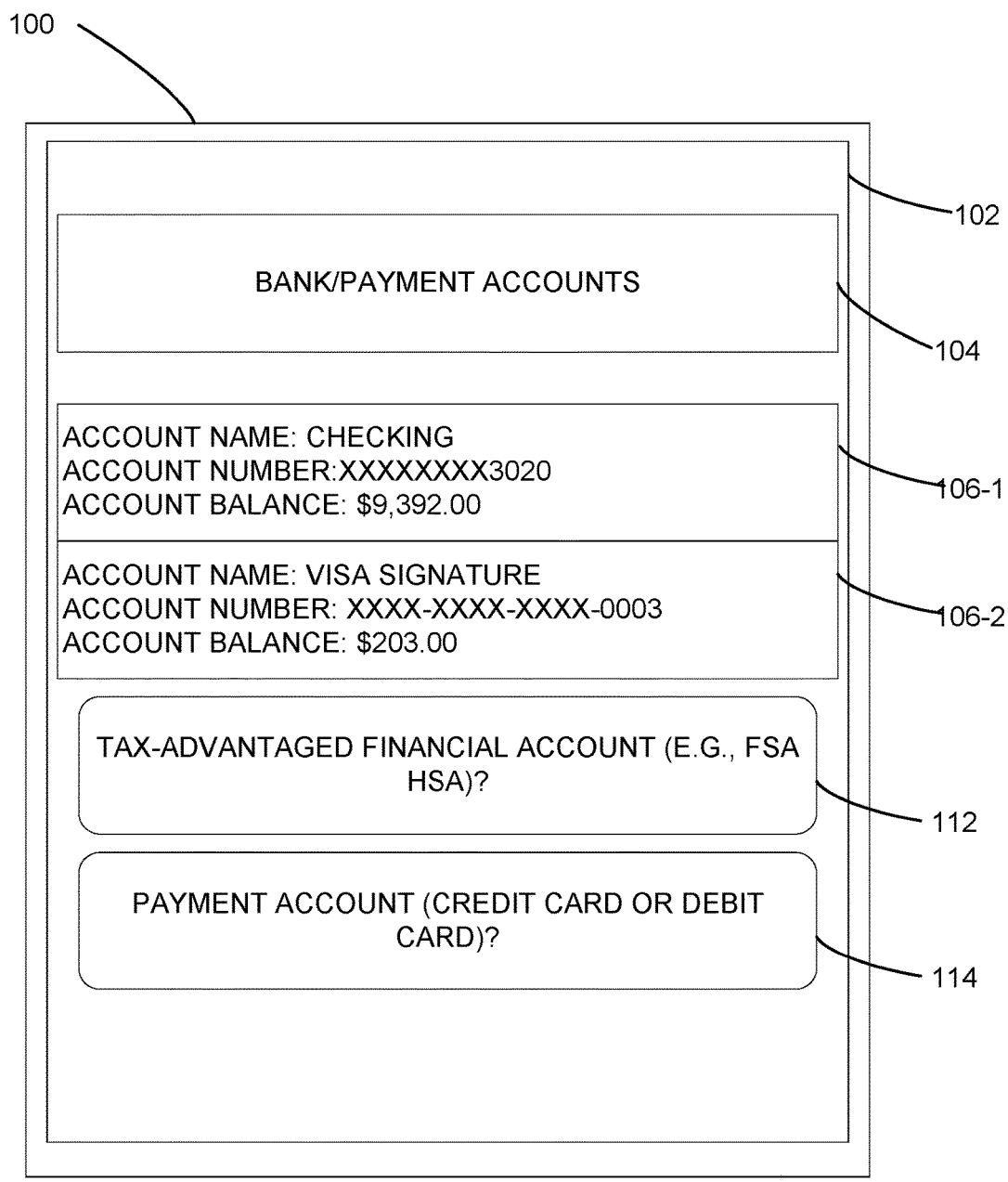
Figure 1C:
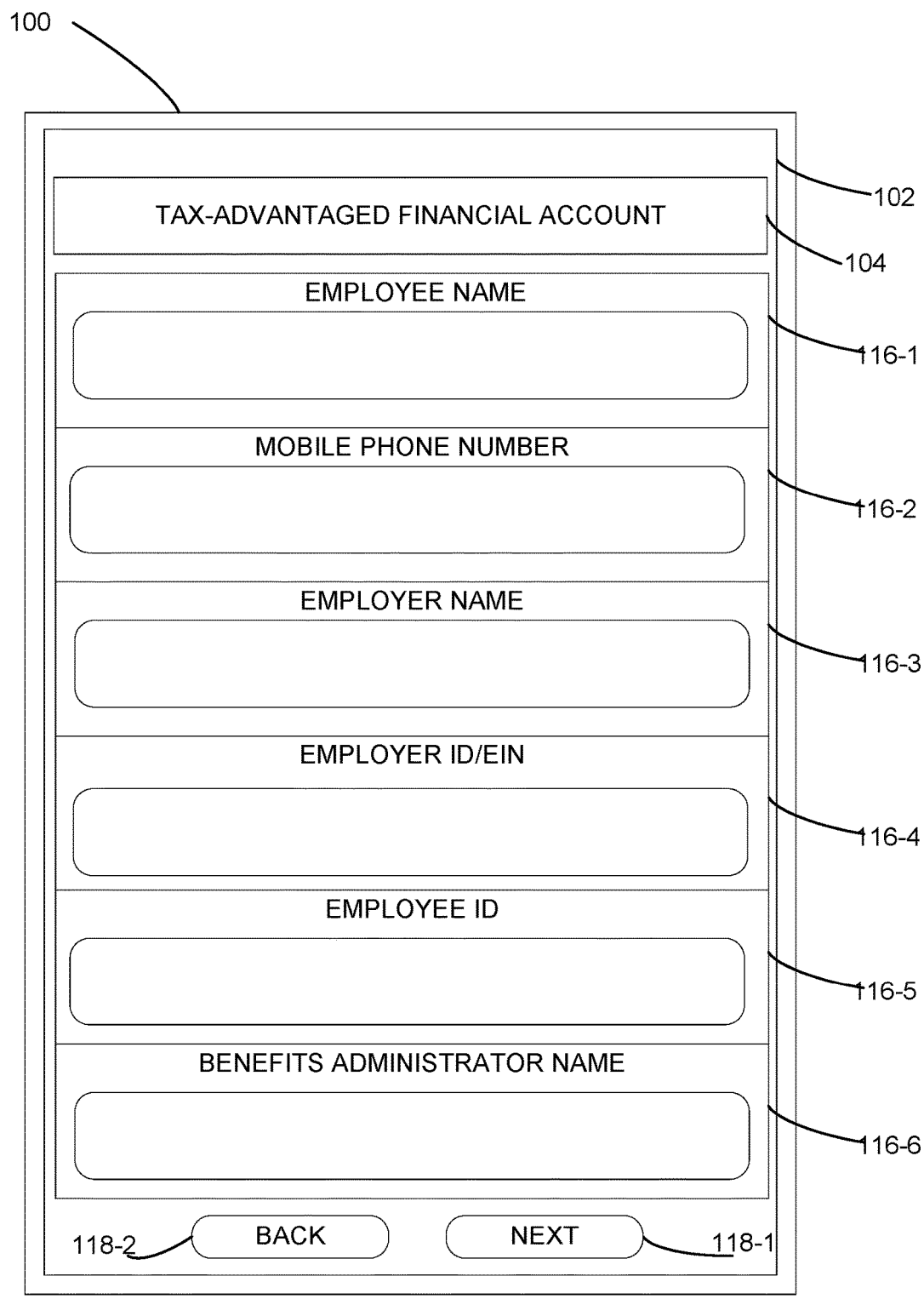
Figure 1D:
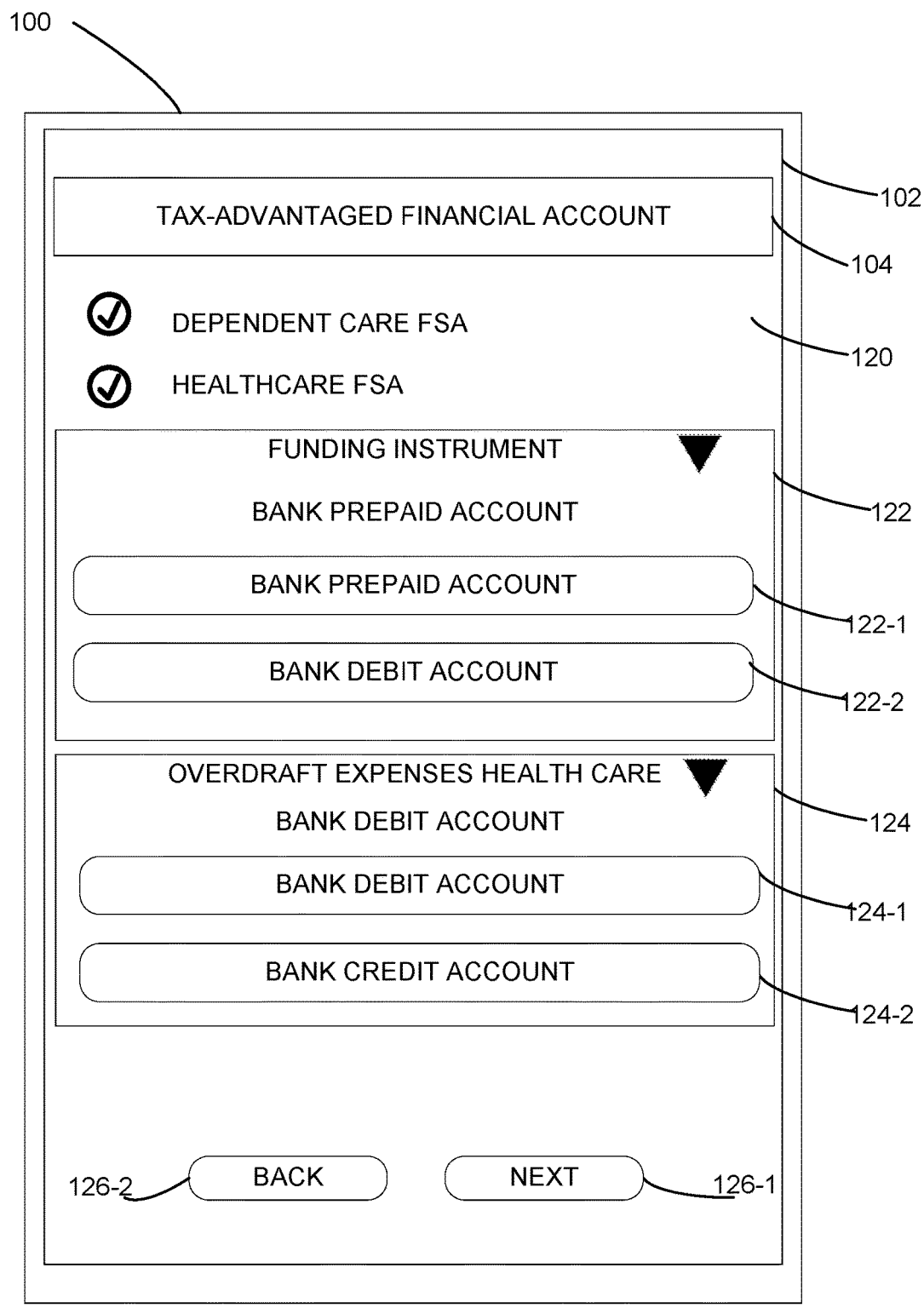
Figure 1E:
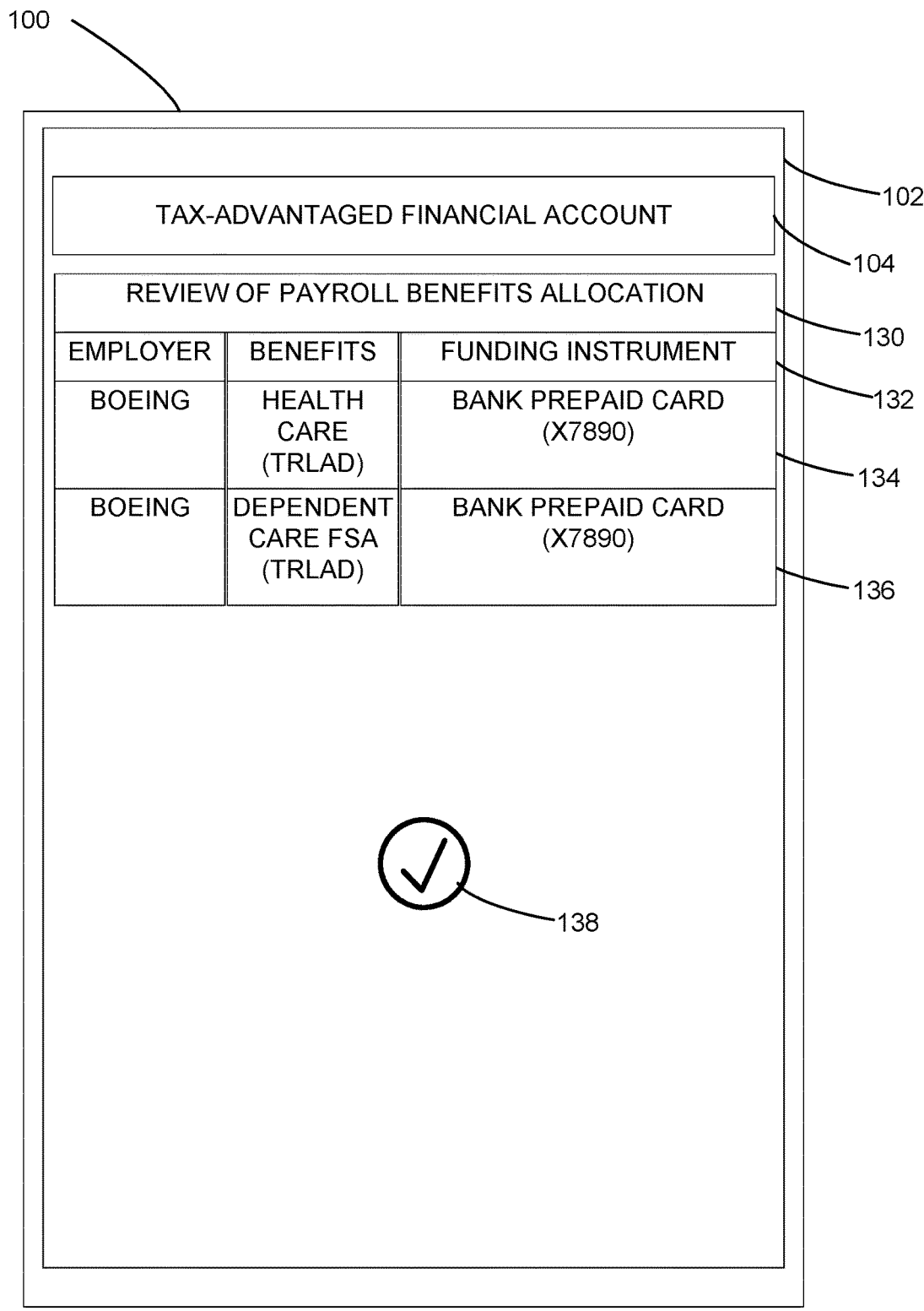
Figure 1:
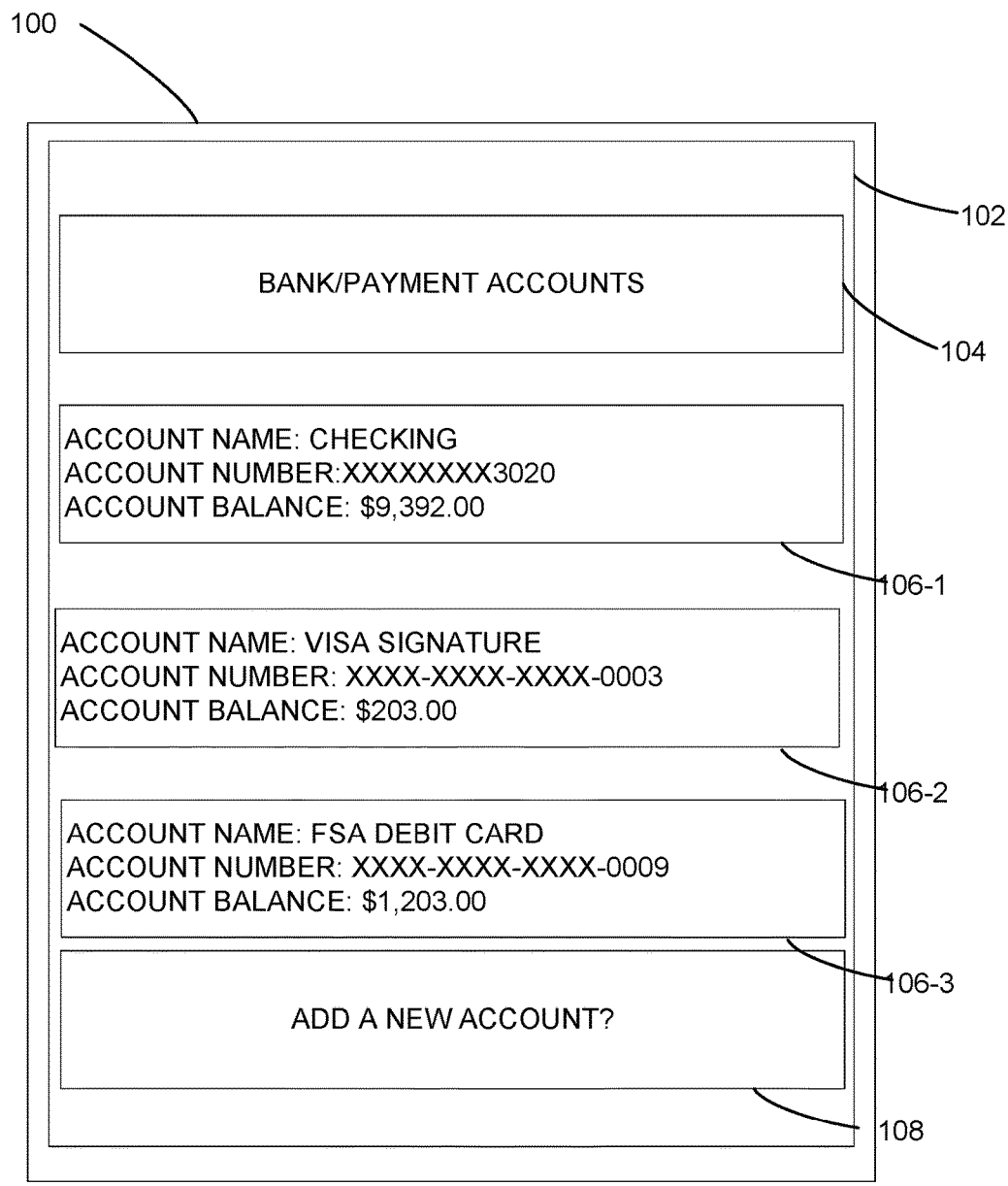

Referring now to FIG. 1, an exemplary graphical user interface (GUI) on a mobile device 100 may be used to illustrate an exemplary use scenario to further illustrate aspects or embodiments. For example, the mobile device 100 may be a smartphone, a tablet computer, a laptop, a smartwatch, a smart speaker, or a device with network connectivity. The mobile device 100 may include a physical screen for displaying objects to a user and may include input components or elements to receive inputs from the user. It is to be understood that the mobile device 100 may provide output such as audio to user, instead visual renderings on the display. It is also to be understood that the user may provide audio input or other inputs (e.g., tactile or gesture) to the mobile device 100 to interact with the mobile device 100. However, for the sake of simplicity and not as a limitation, FIG. 1 illustrates a visual embodiment as an exemplary use scenario.

In this embodiment, a graphical user interface (GUI) 102 may be presented on the mobile device 100 as an application ("app") or software installed thereon. For example, the mobile device 100 may be a device similar to that of a device 801 in FIG. 8 that includes a processor and a memory for storing an operating system that provides an execution environment for the app or software to be executed. In another embodiment, the GUI 102 be instantiated or executed directly by the operating system as a module. In another embodiment, the GUI 102 may be part of an online portal where the user may be connected thereto.

The GUI 102 may provide icons or buttons to interact with the user. For example, the GUI 102 may provide a header 104 for the app or software. Initially, the user may be presented with the GUI 102 to sign up or login. One skilled in the art may appreciate the different ways the user may be authenticated to use the GUI 102.

Once logged in or signed in, the header 104 may provide the scope of the contents in the rest of the GUI 102. For example, the header 104 may display "BANK/PAYMENT ACCOUNTS" to inform the user of the scope of the information below. The GUI 102 may further provide one or more panes identifying the one or more payment accounts. For example, a pane 106-1 may display information about a "CHECKING" payment account, and a pane 106-2 may display information about a "VISA SIGNATURE". In one embodiment, the information of a payment account, such as the "CHECKING," and "VISA SIGNATURE," may include information on an account manager, an account number, a card type (e.g., debit or credit) or other information associated with the payment account. In another embodiment, the mobile device 100 may, once the account manager information is identified or received, establish a connection with a server associated with the account manager. In one example, aspects or embodiments establish an application programming interface (API) such that systems with embodiments may define data packets, authentication protocols, token acknowledgement and issuance, and other data exchanges with the account manager. In another embodiment, systems with embodiments may easily establish connections with merchants, banking institutions, etc., to provide convenience to the user.

In a further embodiment, the mobile device 100 may further receive or obtain parameters associated with the payment account. For example, the parameters include account balances, a payment due date, a payment rule or condition, benefits rules or conditions, benefits database, etc. In one embodiment, the parameters may further include relevant values of the parameters. For example, in an embodiment, a payment account is a benefits program account, and it may only be used on transit expenses and that the account cannot be used at an ATM even though it is a debit card. As such, the mobile device 100 may provide that information available as well. In one embodiment, the parameters may be stored in a database accessible by the system and/or the mobile device.

It is to be understood that while FIG. 1 shows two panes 106-1 and 106-2, other additional panes for other payment accounts may be displayed without departing from the scope or spirit of embodiments.

The GUI 102 may also include a button 108 to enable the user to add additional payment account. FIG. 1B further illustrates the GUI 102 showing additional buttons 112 and 114. For example, the button 112 may enable a user to add a tax-advantaged financial account, such as a medical flexible spending account (FSA), a health savings account (HSA), or a health reimbursement account (HRA). The button 114 may enable the user add other payment accounts, such as a credit card account, a debit card account, or a prepaid account.

FIG. 1C may display additional fields 116 in the GUI 102 to receive inputs from the user in response to the user selecting the button 112, which relates to tax-advantaged financial account information. For example, the fields 116 include, but not limited to:
EMPLOYEE NAME;
MOBILE PHONE NUMBER
EMPLOYER NAME;
EMPLOYER ID/EIN;
EMPLOYEE ID; AND
BENEFITS ADMINISTRATOR NAME.

In one embodiment, the user may not need to enter the answers/information manually as the mobile device 100 may retrieve the needed information from the account manager after connection is established. In such an embodiment, the GUI 102 may display a confirmation window for the user to confirm. In another embodiment, some of the fields 116 may be inactive or "greyed" out such that the user may not alter the content/information. For example, the employer EIN may not be something that the user may know or change. Once the values for the fields are entered, the user may select a next button 118-1 to go to FIG. 1D or a back button 118-2 back to FIG. 1B.

In response to the activation of the button 118-1, provided in FIG. 1C, FIG. 1D further provides additional fields 122 and 124 to obtain or receive further details for the payment account. For example, in response to the activation of the button 112, a pane 120 may display the type of tax-advantaged financial account: FSA. In one embodiment, the pane 120 may identify all related account, such as dependent account, main insured account, or the healthcare account. The GUI 102 further may display a pane 122 to receive or obtain funding instrument information, such as bank prepaid account. In one embodiment, the user may select 122-1 or 122-2 to specify whether such account is a debit account in 122-2 or a prepaid account 122-1. Further, the GUI 102 may display a pane 124 showing overdraft expenses for the healthcare services. In one embodiment, the pane 124 may request the user to confirm whether the overdraft account may be a bank debit account 124-1 or a bank credit account 124-2.

Once the information is received or entered, the user may select next 126-1 to move to FIG. 1E or back 126-2 to FIG. 1C.

Referring to FIG. 1E, the GUI 102 may display a portion of a summary of the information provided in a table 130. The table 130 may include a header row 132 and entry rows such as 134 and 136. Once the user selects a confirmation button 138, the user has completed the entry of the new FSA account.

In response to the selection or activation of the button 138, the user may be transitioned to FIG. 1F, another list of accounts within the GUI 102. FIG. 1A and FIG. 1F are similar except the addition of the newly added FSA account in pane 106-3. In other words, embodiments aggregate parameters of different accounts and provide a unified GUI screen such as the GUI 102 showing the different accounts with their respective parameters and values thereof together. This provides a tremendous amount of convenience to the users where they can readily view a portion of the details or information of each of the payment accounts. In one embodiment, this presentation is extremely useful and helpful when the users are engaging in transactions.

Referring now to FIG. 2, another GUI 202 shows a list of transactions of the newly added FSA account of 106-3 in FIG. 1F.

Figure 3A:
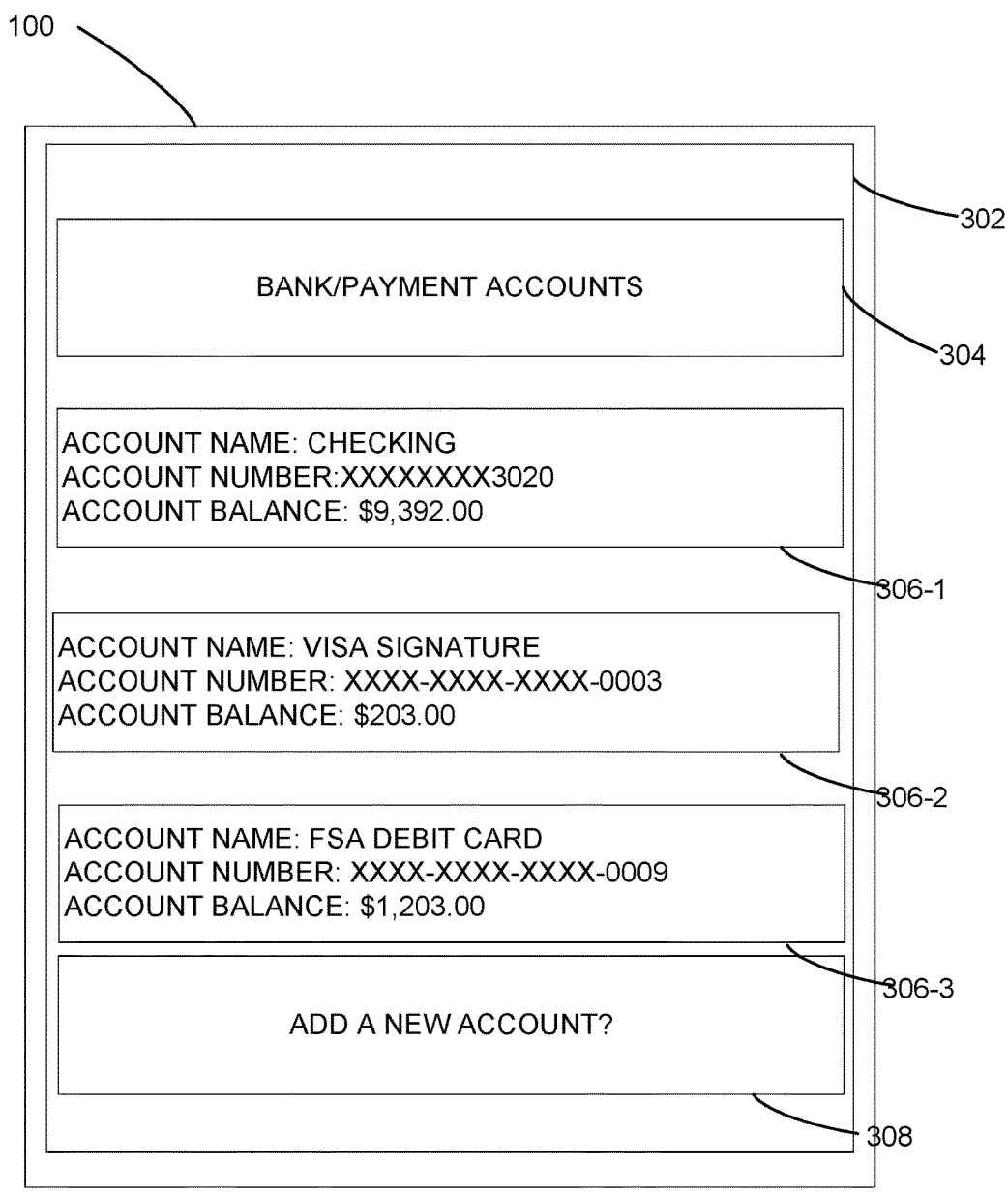
FIGS. 3A to 3C are diagrams illustrating a set of GUI for identifying a particular transaction during checkout according to one embodiment.

Moreover, embodiments are more than providing GUI screens showing the aggregation of the accounts. Aspects or embodiments provide deep contextual correlations among the accounts during processing of transactions. Referring now to FIG. 3A, an initial GUI 302 provides a header 304 and one or more panes 306 showing the different payment accounts. A button 308 to enable the user to add new accounts may be presented on the GUI 302 as well. In one embodiment, the GUI 302 may be presented when the user logs into the app or the web portal. The GUI 302 may remain or be idle, without altering any visual changes.

Figure 3B:
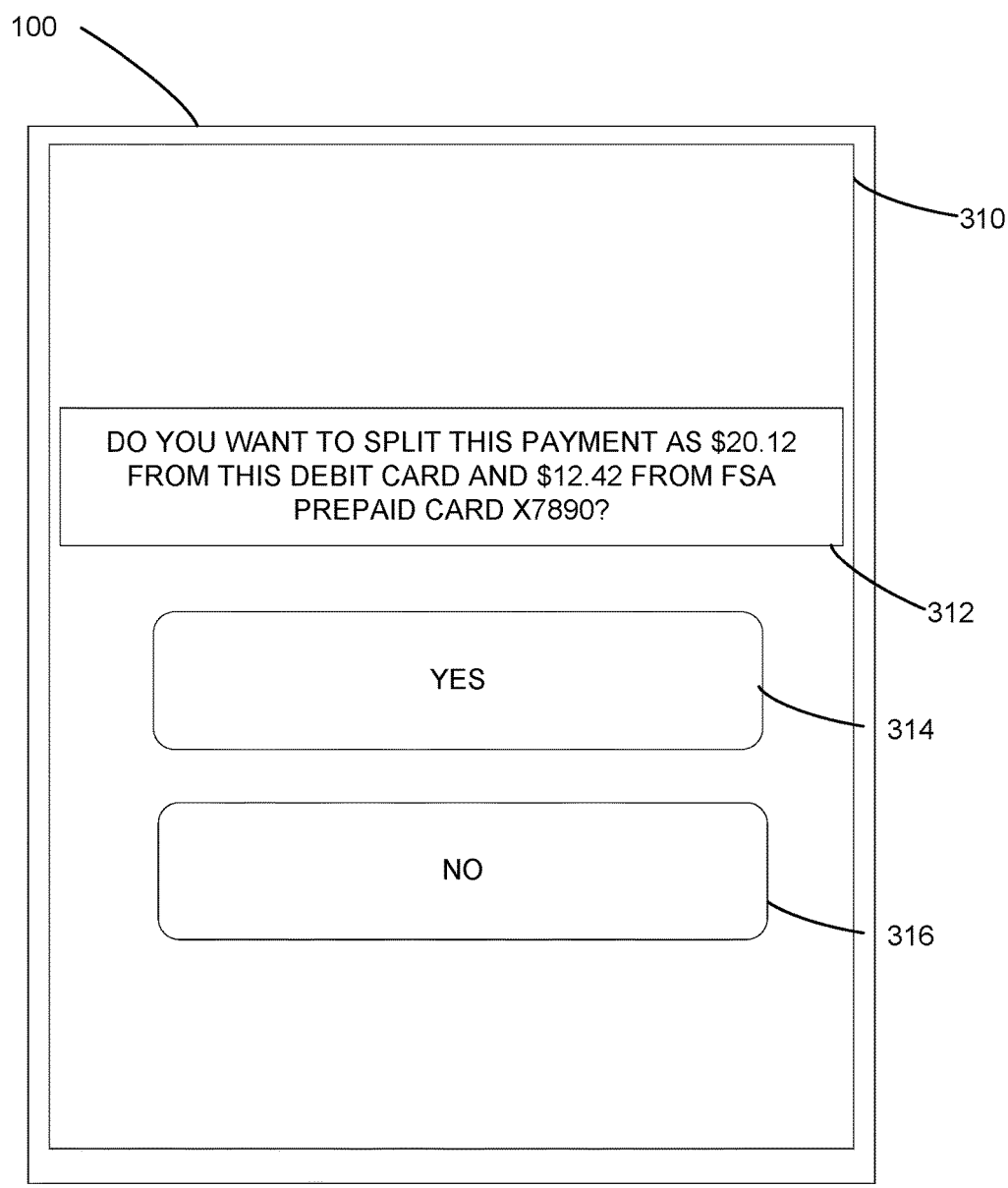
Figure 3C:
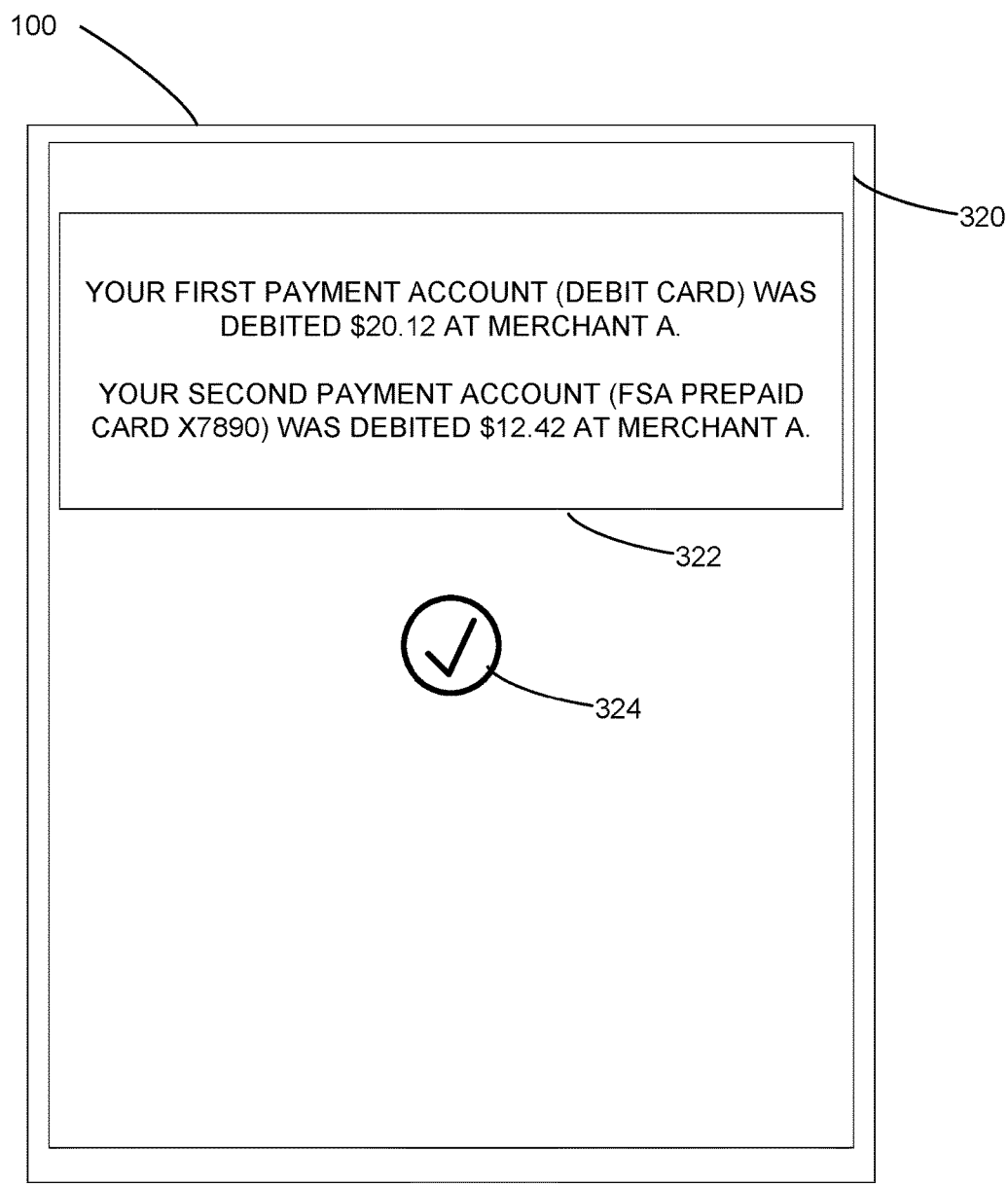

However, in an embodiment, the user activated the GUI 302 as part of her preparation to make a payment at a checkout counter. The user may select pane 106-2 to indicate that the user wishes to use that account to pay for the transaction in the amount of $32.54. Instead of immediately process that selected payment account for payment, embodiments identify whether there may be a more suitable account, among all the accounts that the user may have in the GUI 302, to pay for this transaction. In one embodiment, the mobile device 100 may analyze or identify the items to be purchased in this transaction and determine whether any of the items may satisfy any of the parameters or benefits rules or conditions. If such conditions or rules are satisfied, the mobile device 100 may provide, via a GUI 310 in FIG. 3B, a notification or suggestion 312 to the user. For example, the notification 312 may indicate an alternative payment account should be used. In another embodiment, the notification 312 may indicate that two payment accounts may be used and provide a split payment amount. In this example and as shown in FIG. 3B, the mobile device 100 may suggest to have the total amount split 2 ways between two accounts: $20.12 for the account in the pane 306-2 and $12.42 for the account in the pane 306-3. The GUI 310 may further provide a confirmation button 314 or a deny button 316.

As such, aspects or embodiments provide a contextual spending intelligence to assist the user to use the right or more appropriate payment account for a given transaction. This remove all previous guess work by the user or the need for the user to remember or look up balances or verify the right conditions are met. Moreover, the contextual suggestion or notification is seamless to the user.

Once the user selects the button 314 to accept the suggested usage of the payment accounts, the mobile device 100 transitions to a GUI 320 showing a summary notification 322 of the transaction. In one embodiment, the GUI 320 may also provide a final confirmation button 324 to return to the initial GUI 302.

Figure 4A:
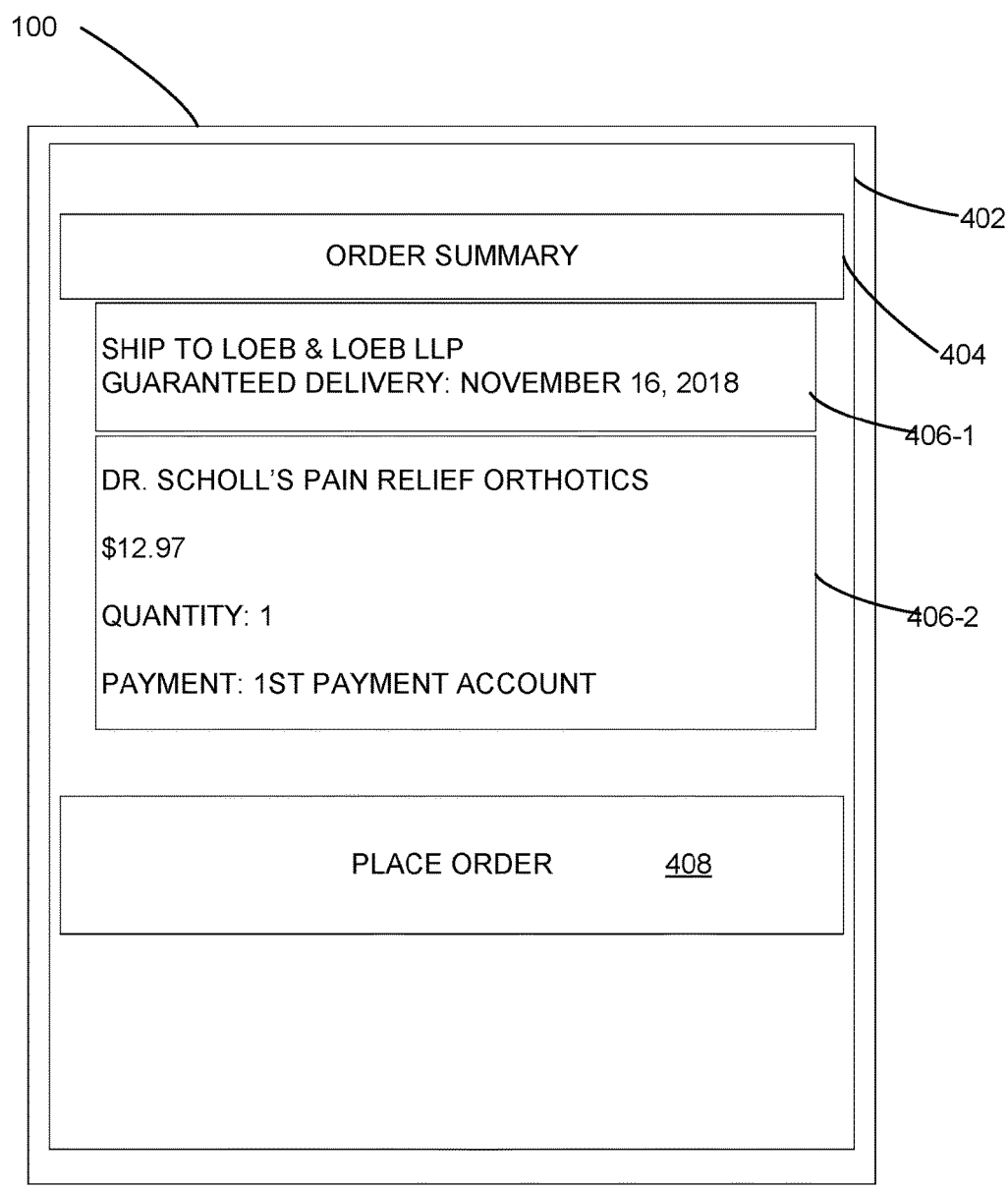
FIGS. 4A to 4D are diagrams illustrating a set of GUI for identifying a particular transaction post-checkout according to one embodiment.

Referring now to FIGS. 4A to 4D, a set of GUI screens according to another embodiment. FIGS. 4A to 4D may be best suited in addressing the following exemplary operation scenario. For example, in an embodiment, the user may be using another app or on another web page to make a transaction. FIG. 4A illustrates a final checkout page showing the GUI 402 from another app that is different from the GUI screens provided in FIGS. 1 through 3C. In other words, the GUI 402 may be, in a sense, a different execution environment from the app providing the GUI screens shown in FIGS. 1 to 3C such that these apps may not exchange data between each other. The GUI 402 may provide a header 404 and detail panes 406 of the pending transaction. For example, the details pane 406 may include a first pane 406-1 showing shipping and delivery information of the item to be purchased. A second pane 406-2 may provide information such as the name of the item, unit cost, quantity and the payment account. The GUI 402 further may provide a checkout or "PLACE ORDER" button 408 for the user to activate or select to make the transaction.

Upon selecting the button 408 on the GUI 402 (e.g., the checkout has completed), the mobile device 100 may provide a GUI 412. In one embodiment, a platform or system (to be further described in FIG. 6) of embodiments monitors transactions of the one or more payment accounts of the user, such as those ones shown in FIG. 3A. In one embodiment, the platform or system may monitor the transactions while reviewing details of the transactions, such as the item description, the cost, the merchant, etc.

As such, upon completing the transaction in FIG. 4A, the mobile device 100 may generate the GUI 412 with a notification 414 on the GUI 412 to provide a contextual or smart suggestion regarding the transaction that has just completed:

YOUR RECENT PURCHASE WITH THE FIRST PAYMENT ACCOUNT HAS FSA-ELIGIBLE EXPENSES. DO YOU WANT TO MOVE THAT TO YOUR SECOND PAYMENT ACCOUNT?

In one embodiment, the notification 414 may be triggered or activated if a particular transaction, among the transactions been monitored by the system embodying the invention, includes information that is associated with the parameters of the payment accounts. In this example, the system has identified that the description of the item "orthotics" to be an item that would satisfy conditions of a FSA account, which the user has already added to the app running the GUI screens in FIGS. 1 to 3C.

In this example, the FSA account being a second payment account while the payment account that the user uses to pay for the transaction in FIG. 4A is the first payment account.

Figure 4B:
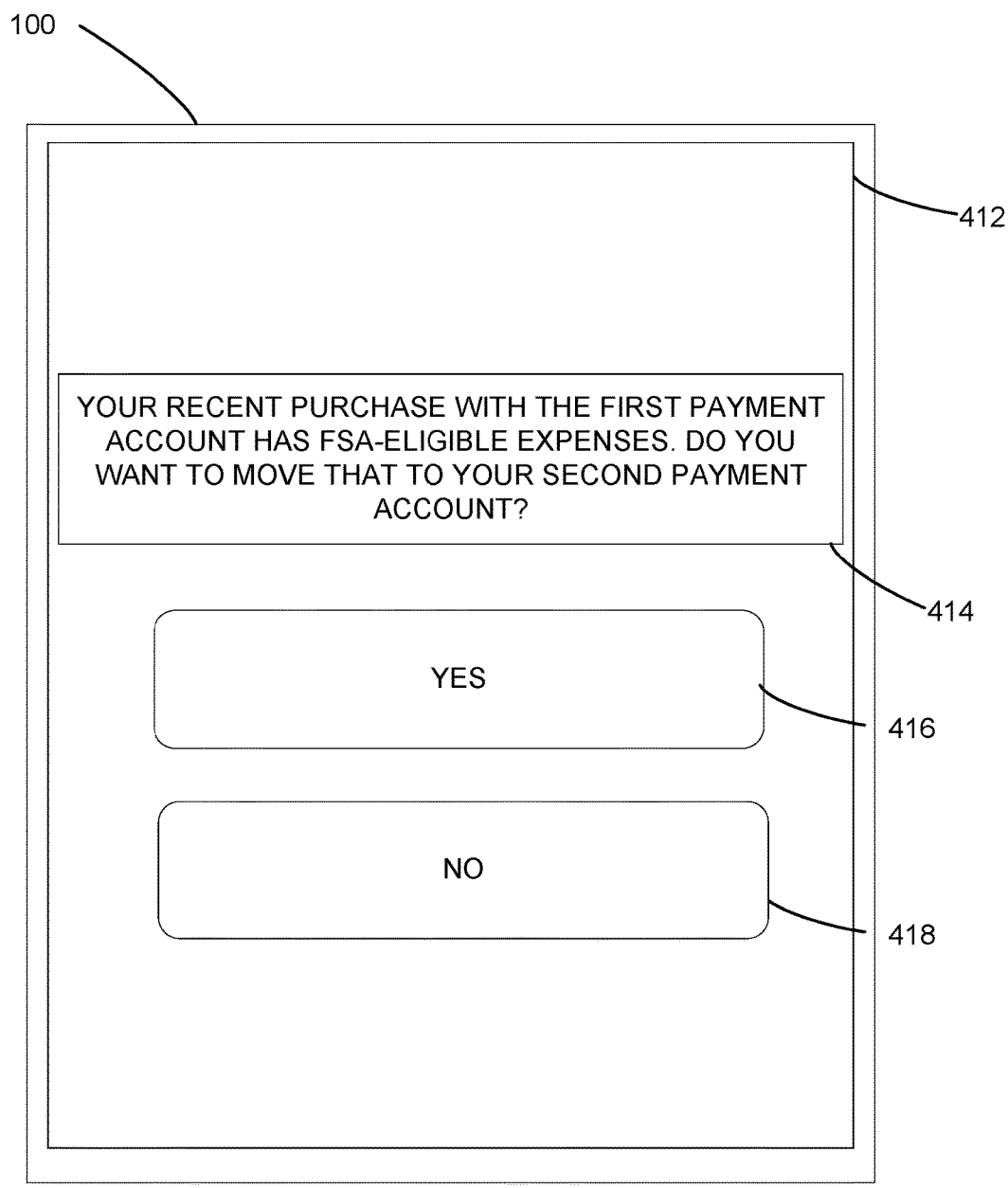
Figure 4C:
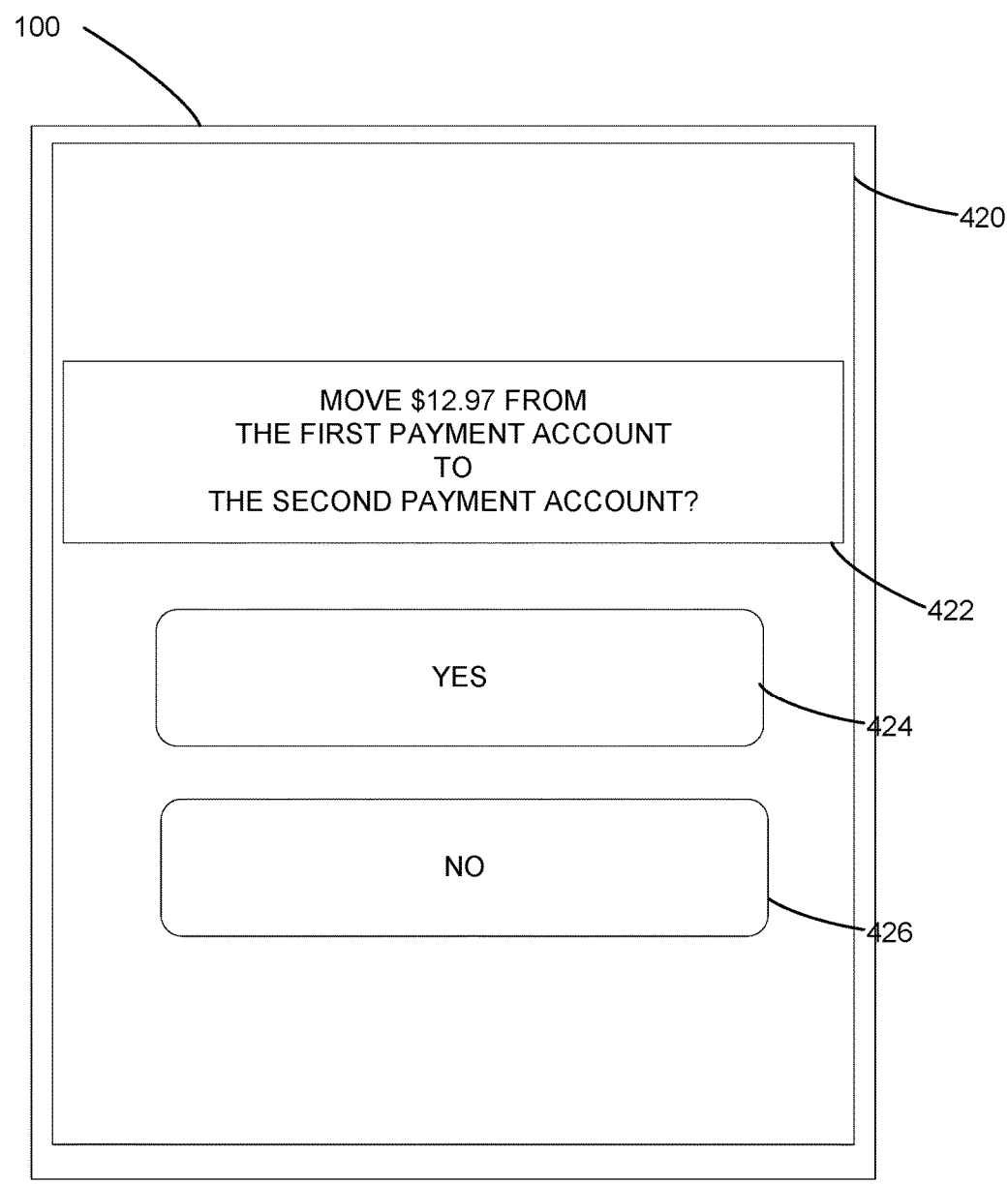
Figure 4D:
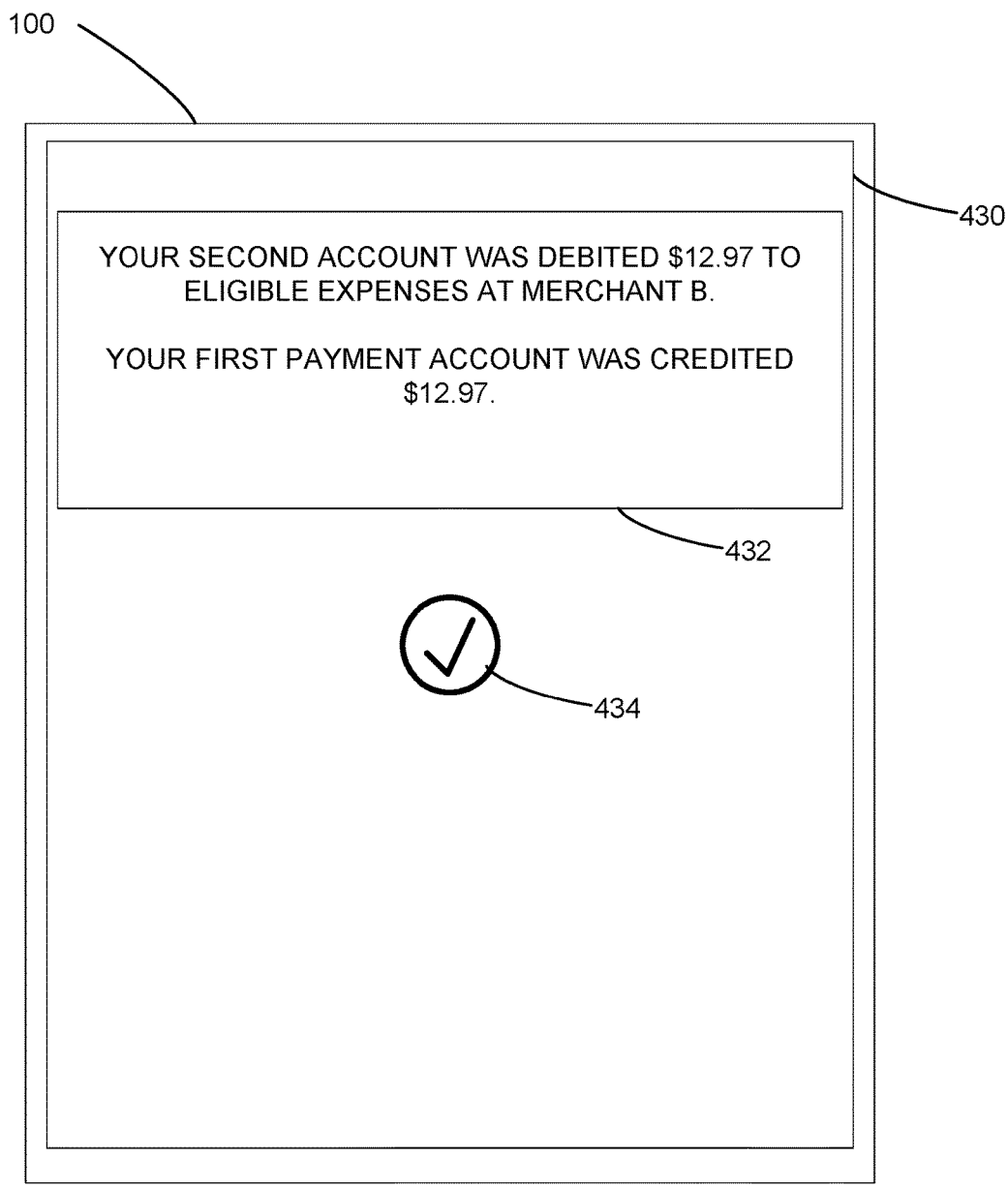

At FIG. 4B, the user may select a confirmation button 416 or a reject button 418 to the notification message or suggestion. If the user selects or activates the button 416, the user may be provided with another GUI 420 with a final confirmation 422 about the next step of the contextual payment plan. In this example, the contextual payment plan may be to move the already charged amount of $12.97 from the first payment account to the second payment account. The GUI 422 may again provide a confirmation button 424 and a rejection button 426. If the user selects the button 424, the mobile device 100 provides a GUI 430 with a message 432 confirming the user's selection. The user may also select a button 434 to return to the initial screen.

Upon selecting the button 434, the mobile device 100 may, alternatively, provide a GUI 502 showing a list of transactions for the second payment account. In addition to the transactions in 508-1 and 508-2, a newly added transaction record 508-3 is displayed, showing the transaction in FIGS. 4A to 4C has been charged to the second payment account. At the same time or substantially simultaneously, the mobile device 100 may provide an update to the first payment account in a GUI 512. The GUI 512 displays a header 514 and a list 516 of transactions. The two most recent transactions are the two resulting from the contextual payment plan:

518-1 showing a deduction of $12.97, and 518-2 showing a refund of $12.97.

In one embodiment, the update to the first payment account and the second payment account may be real-time and automatic such that the user may not need to "refresh" the account. In another embodiment, the refresh rate may be dictated by the API. In another embodiment, the refresh rate may be determined by the connection speed between the mobile device and the server of the account managers of the payment accounts.

Figure 5B:
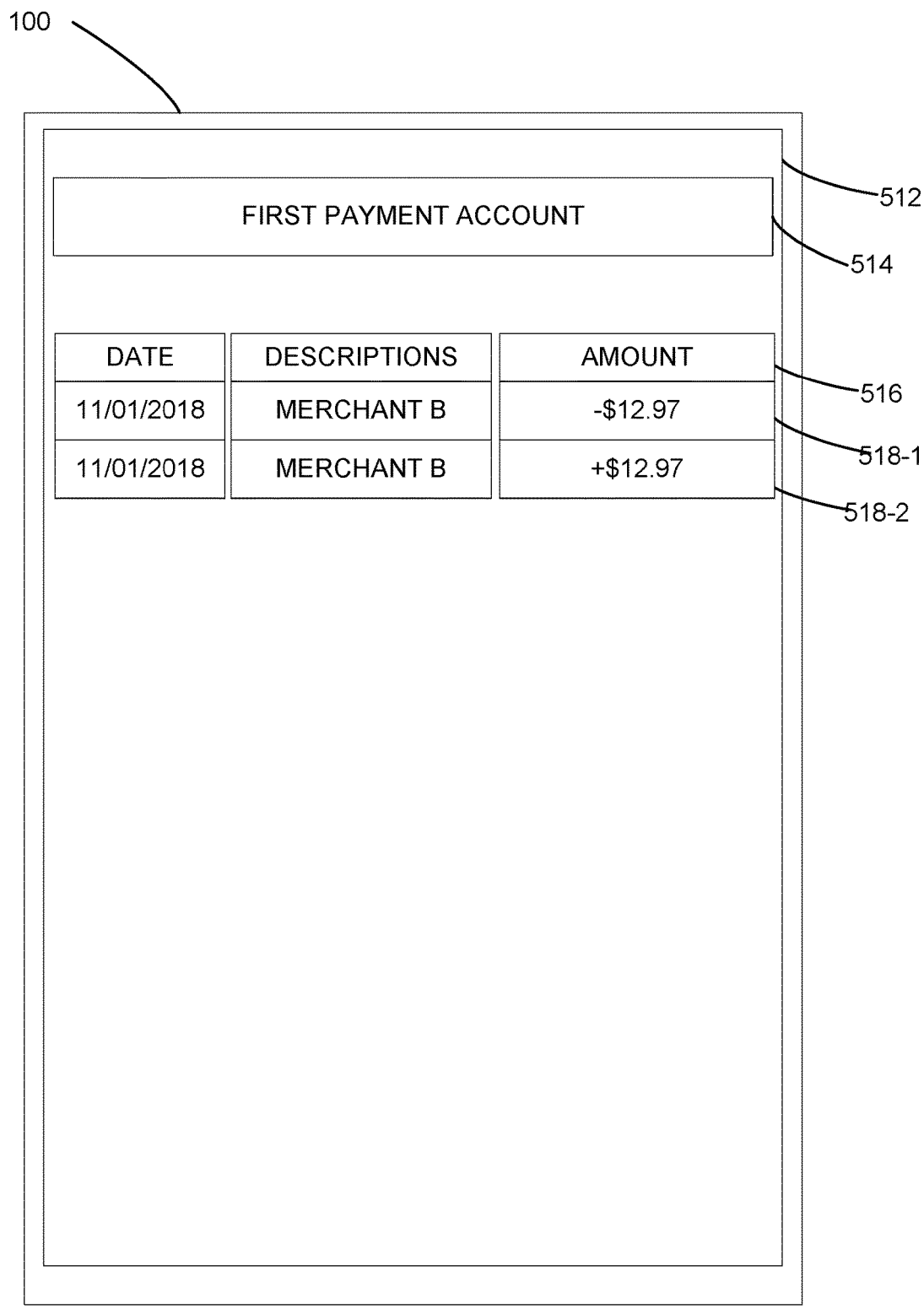

It is also to be understood that the FIGS. 5A and 5B may not be readily visible until the user activates the app that runs or supports the GUIs 502 and 512.

Embodiments therefore provide the contextual payment plan not only during checkout but also post-checkout such that the user may retroactively modify a transaction, This post-checkout modification may be similar to returning an item to a store after the consumer discovers that he or she might have used the wrong payment account. Embodiments solve this problem technically with solutions discussed above.

Figure 6:
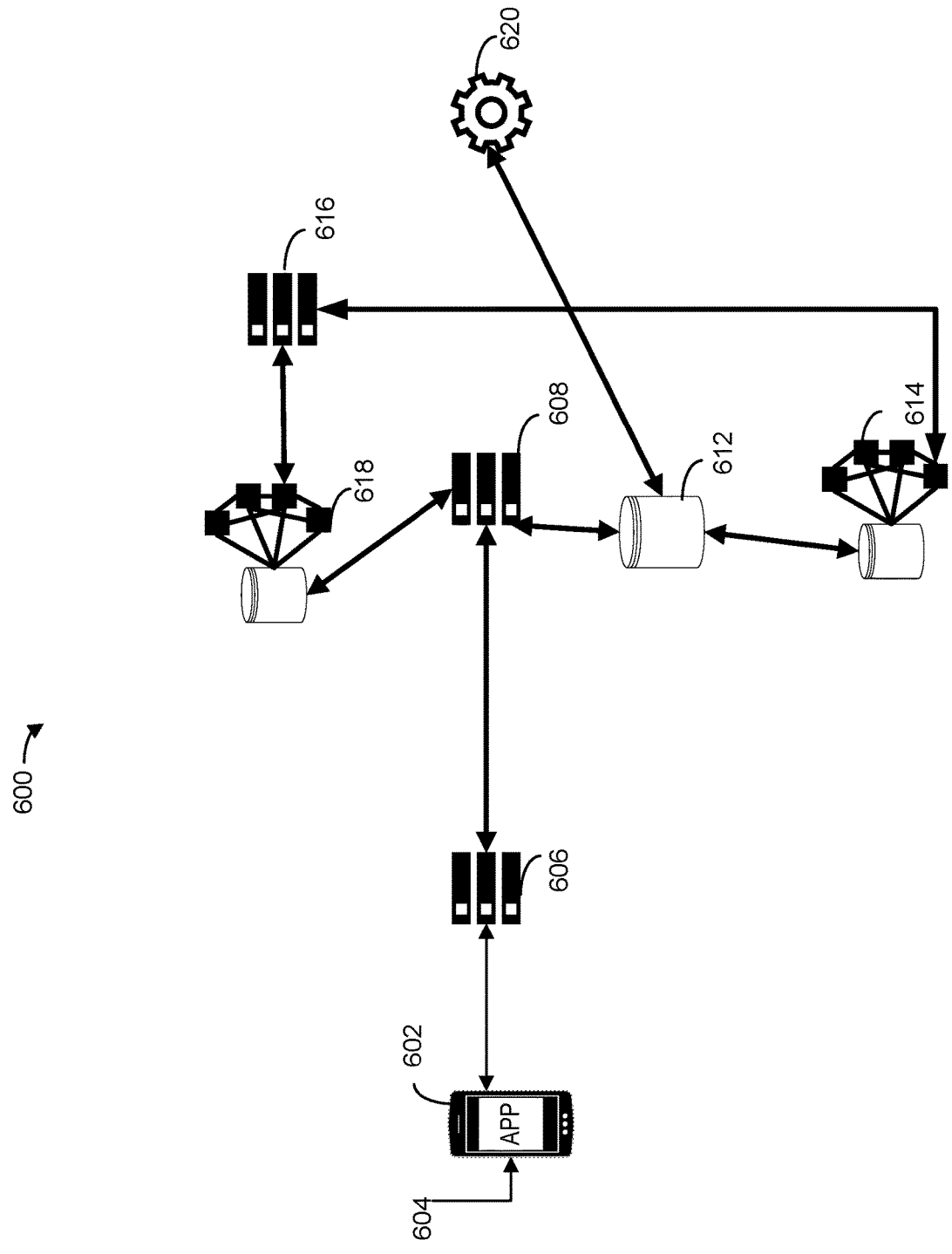
FIG. 6 is a diagram illustrating a system according to one embodiment.

FIG. 6 illustrates a system 600 diagram of embodiments. In one embodiment, the system 600 includes one or more different entities or parties, such as:

Employee/End-user
Employer (e.g., employer)
Payroll Processor or provider (e.g., ADP)
Government Disability Benefit Provider (e.g., California Employment Development Department (EDD)
Benefits Administrator (e.g., Triad)
End-user's bank (e.g., federal bank)
Issuing Processor (e.g., TSYS)
Acquiring Processor (e.g., First Data)
Merchant (e.g., Walgreens)
Payment processor The system may include a user with a mobile device 602. The mobile device 602 may include an app or a software program product to provide functionalities and interfaces such as those shown in FIGS. 1 to 5B to interact with the user. A merchant 606 interfaces with the mobile device 602, the app 604 and the user during a transaction where the user uses a payment account in the app 604 to make a payment to the merchant 606.

The merchant 606 may transmit the transaction request to a transaction processing server 608 to determine whether the transaction may be authenticated. The transaction processing server 608 may further interact or access a database 612 to identify whether any of the parameters of the payment accounts apply to the transaction request that is being evaluated. Once the transaction processing server 608 determines one or more of the parameters is associated with the transaction or matches to one of the conditions or rules of the benefits, the transaction processing server 608 may activate a payment server 614 to provide funds to a bank institution 616 to authorize the payment. In one embodiment, the payment server may include, after accessing the database 612, funding the transaction from a back-up funding source. The system 600 may further include an issuer server 618 to finalizing the authorization of the payment to the merchant 606. The app 604 may provide the notifications, as discussed in figures above, or other kinds of notifications, to the user.

In one embodiment, the transaction processing server 608 may provide or push the GUIs in FIGS. 1 to 5B displayed in the app 604.

In another embodiment, the system 600 may include a management portal 620 to manage the information stored in the database 612. In one embodiment, the management portal 620 may include different user access permissions to control or manage different aspects of the payment accounts. In another embodiment, the management portal 602 may further allow bulk data feeds such as via secured file transfer protocol (FTP), electronic data interchange (EDI), or Blockchain data transmission to update or modify records stored in the database. For example, the management portal 620 may be used by payroll managers or payroll service providers to manage various accounts for employers or government entities to distribute paychecks to employees, manage direct deposits to employees, manage deductions with tax advantaged financial accounts, manage deductions with transit benefit accounts, and other types of accounts via payroll. As such, the management portal 620 may expose various data fields or data information via API or other connectivity tools used between different computer systems, etc.

Embodiments further provide a data structure that may be more suitable for taking advantageous various features of embodiments. For example, the new data structure may set aside a data field or a "flag" for any transaction such that systems of embodiments may activate or deactivate in response to finding a suspected transactions. For example, the transaction processing server 608 may append a data field to each transaction data packet or add flag data to the transaction data packet if existing structure includes an unused data field. This new data field or flag data may indicate to the transaction processing server 608 that the transaction or charge may be presented to the user for confirmation.

Figure 7:
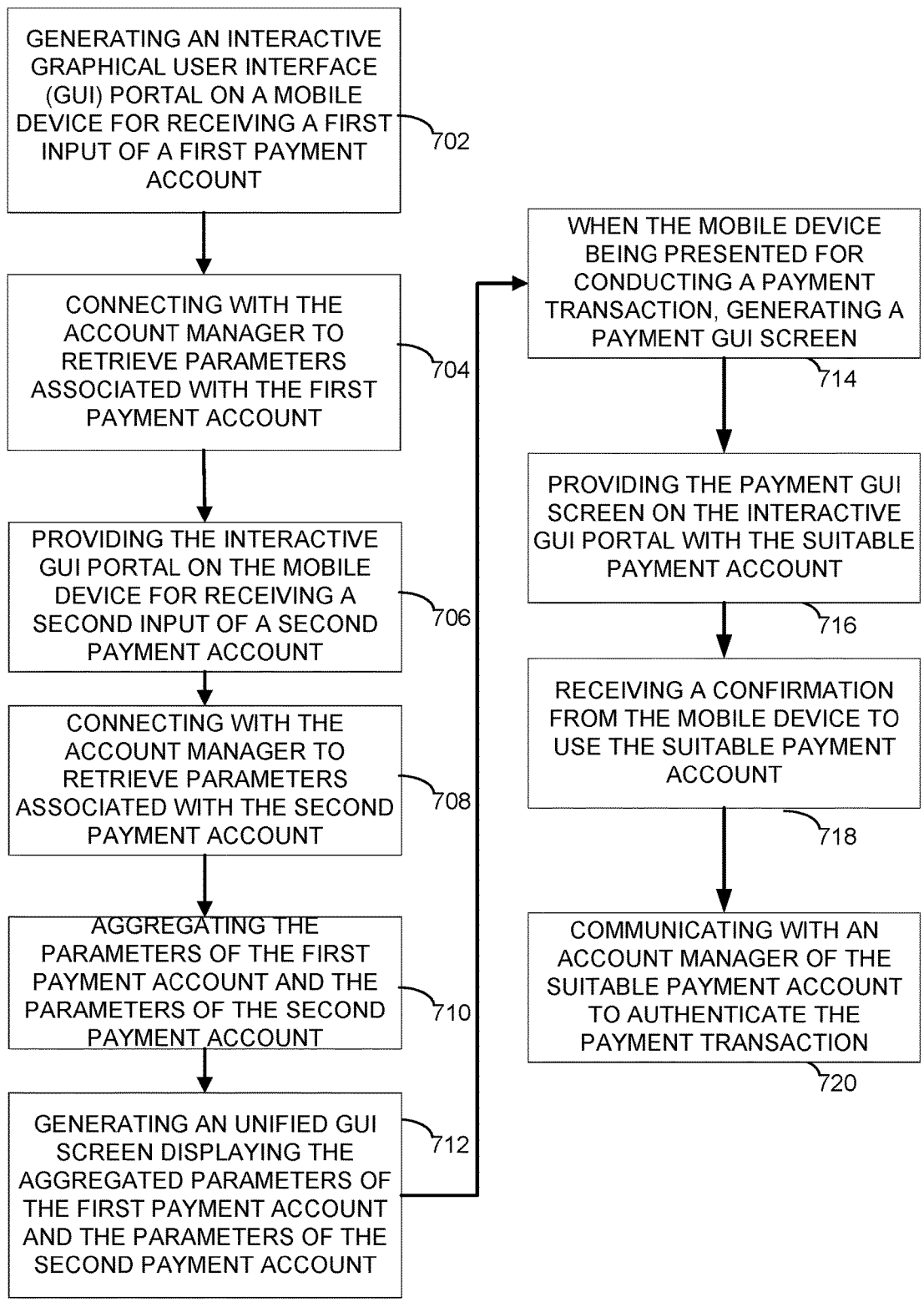
FIG. 7 is a flowchart illustrating a computerized method according to one embodiment.

Referring now to FIG. 7, a flow chart illustrating a computerized method for building a contextual payment infrastructure. At 702, an interactive graphical user interface (GUI) portal may be generated on a mobile device for receiving a first input of a first payment account. In one embodiment, the first input may include one of the following: information on an account manager of the first payment account, an account number of the first payment account, and a card type of the first payment account. At 704, based on the received first input, the method may connect to the account manager to retrieve parameters associated with the first payment account. The parameters may include at least one of the following: an account balance, a payment due date, and a payment rule. At 706, the interactive GUI portal further may receive a second input of a second payment account, and the second input may include one of the following: information on an account manager of the second payment account, an account number of the second payment account, and a card type of the second payment account, and benefit information associated with the second payment account.

In another embodiment, at 708, based on the received second input, the method may connect to the account manager to retrieve parameters associated with the second payment account. These parameters may include at least one of the following: an account balance, a payment due date, a payment rule, and a benefit balance of the benefit information. In one example, the first payment account may be different from the second payment account. In one embodiment, the parameters of the first payment account and the parameters of the second payment account may be aggregated at 710. At 712, a unified GUI screen may be generated to display the aggregated parameters of the first payment account and the parameters of the second payment account. At 714, when the mobile device may be presented for conducting a payment transaction, the method may generate a payment GUI screen. The method may identify from the first payment account and the second payment account a suitable payment account for the payment transaction. At 716, the payment GUI screen on the interactive GUI portal may present the suitable payment account. At 718, a confirmation from the mobile device may be received to use the suitable payment account. At 718, the method may communicate with an account manager of the suitable payment account to authenticate the payment transaction.

In another embodiment, the method may monitor transactions of the payment accounts stored in the app 604. In another embodiment, upon detecting associations between one or more parameters of the payment accounts and a particular transaction, the method may prompt to the user to retroactively modify the payment account for the transaction.

Figure 8:
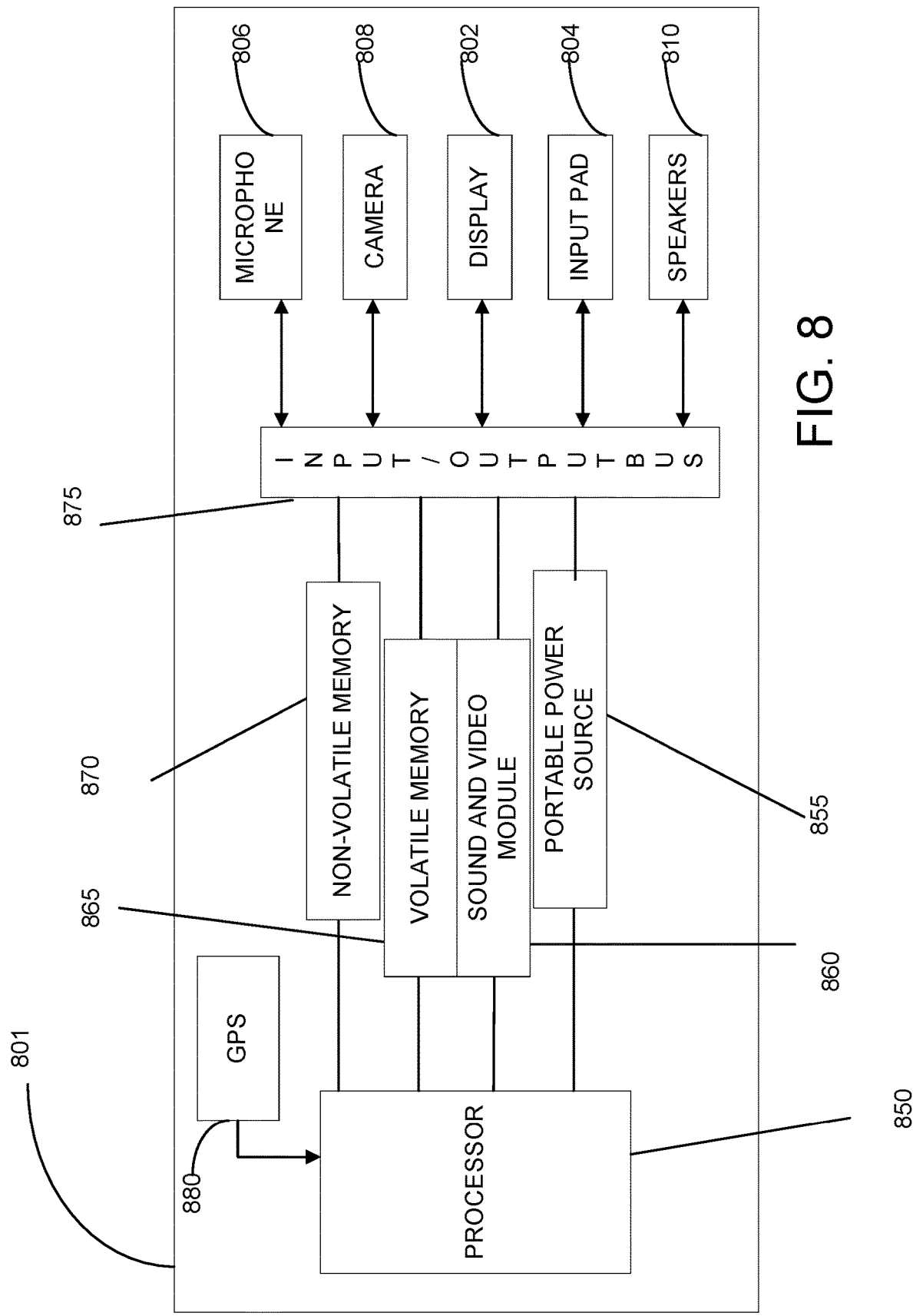
FIG. 8 is a diagram illustrating a portable computing device according to one embodiment.

FIG. 8 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 8 may be a simplified illustration of the physical elements that make up a portable computing device 801 and FIG. 9 may be a simplified illustration of the physical elements that make up a server type computing device 841.

FIG. 8 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 9. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel Corporation, AMD, ARM, Qualcomm, or MediaTek); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, iOS, Android, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments will become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods described herein may be configured for improving verification and discovery of merchants or stores that do not accept non-cash payment devices or that do accept non-cash payments devices but differentiate them between local/national issued ones versus foreign issued ones. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized method for a contextual payment and account management infrastructure comprising:
   providing, by a processor of a transaction processing server, an interactive graphical user interface (GUI) portal to a mobile device;
   receiving, by the processor from the interactive GUI portal of the mobile device, a first input of a first payment account, said first input comprising one of the following: information on the transaction processing server of the first payment account, an account number of the first payment account, and a card type of the first payment account;
   retrieving, by the processor, parameters associated with the first payment account, said parameters comprising at least one of the following: an account balance, a payment due date, and a payment rule;
   receiving, by the processor from the interactive GUI portal of the mobile device, a second input of a second payment account, said second input comprising one of the following: information on a second transaction processing server of the second payment account, an account number of the second payment account, and a card type of the second payment account, and benefit information associated with the second payment account, wherein the first payment account comprises a first tax-advantaged benefit payment account, wherein the second payment account comprises a second tax-advantaged benefit payment account, wherein the first and second tax-advantaged benefit payment accounts each comprises at least one of a flexible spending account (FSA), a health savings account (HSA), and a health reimbursement account (HRA);

retrieving, by the processor, parameters associated with the second payment account, said parameters comprising a payment rule of the second payment account and at least one of the following: an account balance, a payment due date, and a benefit balance of the benefit information;

wherein the first payment account is different from the second payment account;

aggregating, by the processor, the parameters of the first payment account and the parameters of the second payment account;

providing, by the processor to the interactive GUI portal of the mobile device, a unified GUI screen that includes the aggregated parameters of the first payment account and the second payment account, wherein the unified GUI screen provides the parameters of the first payment account in a first display region and provides the parameters including the benefit balance of the second payment account in a second display region;

receiving, by the processor from the interactive GUI portal of the mobile device, a completed payment transaction using the first payment account;

using, by the processor, the first payment account, without additional inputs from a user, automatically, and identifying, by the processor, a purchased product and purchase amount in the completed payment transaction that meets the payment rule of the second payment account and maximizes the benefit balance of the second payment account based on descriptions of the purchased product;

providing, by the processor to the interactive GUI portal of the mobile device, a post-payment GUI screen that includes a textual message indicating to the user that the purchased product meets the payment rule of the second payment account and asking the user if they would like to transfer all or a portion of the payment amount for the purchased product from the first payment account to the second payment account;

receiving, by the processor from the interactive GUI portal of the mobile device, a confirmation selection by the user from the post-payment GUI screen to transfer all or a portion of the payment amount for the purchased product from the first payment account to the second payment account from the mobile device to process the payment order and the payment amounts;

providing, by the processor to the interactive GUI portal on the mobile device, a confirmation GUI screen that displays to the user on the interactive GUI portal all or a portion of the payment amount to be credited to the first payment account and all or a portion of the payment amount that is to be deducted from the second payment account;

receiving, by the processor from the interactive GUI portal of the mobile device, a confirmation from the user via the confirmation GUI screen to transfer all or a portion of the payment amount for the purchased product from the first payment account to the second payment account;

crediting, by the processor, all or a portion of the purchase amount of the purchased product to the first payment account; and deducting, by the processor, all or a portion of the purchase amount of the purchased product to the second payment account by communicating with the second transaction processing server.

2. The computerized method of claim 1, wherein providing the interactive GUI portal comprises providing, by the processor to the mobile device, the interactive GUI portal to receive additional inputs associated with additional payment accounts.

3. The computerized method of claim 1, wherein the benefit information associated the second payment account comprises benefit information associated with a tax-advantaged financial account.

4. The computerized method of claim 1, wherein all or a portion of the payment amounts to be transferred from the first payment account to the second payment accounts includes an uneven split between the first payment account and the second payment accounts.

5. The computerized method of claim 1, wherein providing the unified GUI screen comprises providing, by the processor to the interactive GUI portal of the mobile device, the unified GUI screen displaying at least the following parameters of the second payment account: the card type, the account number, and the account balance.

6. The computerized method of claim 1, further comprising determining a maximum benefit amount of the completed payment transaction.

7. The computerized method of claim 1, further comprising providing, by the processor to the interactive GUI portal of the mobile device, a historical payment screen of the second payment account in response to receiving, by the processor from the interactive GUI portal of the mobile device, a selection of the second payment account on the unified GUI screen on the mobile device.

8. A computerized method for a contextual payment and account management infrastructure comprising:

providing, by a processor of a transaction processing server, an interactive graphical user interface (GUI) portal to a mobile device;

receiving, by the processor from the interactive GUI portal of the mobile device, a first input of a first payment account, said first input comprising one of the following: information on the transaction processing server of the first payment account, an account number of the first payment account, and a card type of the first payment account;

retrieving, by the processor, parameters associated with the first payment account, said parameters comprising at least one of the following: an account balance, a payment due date, and a payment rule;

retrieving, by the processor, parameters associated with an alternative payment account from a different account processing server managing the alternative account, said parameters comprising a benefit balance and a payment rule of the alternative account;

providing, by the processor to the interactive GUI portal of the mobile device, a unified GUI screen that includes the parameters of the first payment account in a first display region and the parameters of the alternative payment account in a second display region, wherein the first payment account comprises a first tax-advantaged benefit payment account and the alternative payment account comprises a second tax-advantaged benefit payment account, wherein the first and second tax-advantaged benefit payment accounts each comprises at least one of a flexible spending account (FSA), a health savings account (HSA), and a health reimbursement account (HRA);

detecting, by the processor, a completed payment transaction processed by the first payment account;

identifying, by the processor, without additional inputs from a user, automatically, a purchased product and purchase amount in the completed payment transaction that meets the payment rule of the alternate payment account and maximizes the benefit balance of the alternate payment account based on descriptions of the purchased product;

providing, by the processor to the interactive GUI portal of the mobile device, a settlement GUI screen that includes a textual message indicating to the user that the purchased product meets the payment rule of the alternate payment account and asking the user if they would like to transfer all or a portion of the payment amount for the purchased product from the first payment account to the alternate payment account;

receiving, by the processor from the interactive GUI portal of the mobile device, a selection by the user from the settlement GUI screen to transfer all or a portion of the payment amount for the purchased product from the first payment account to the alternate payment account;

providing, by the processor to the interactive GUI portal of the mobile device, a confirmation GUI screen that displays to the user on the interactive GUI portal all or a portion of the payment amount to be credited to the first payment account and all or a portion of the payment amount that is to be deducted from the alternate payment account;

receiving, by the processor from the interactive GUI portal of the mobile device, a confirmation from the user via the confirmation GUI screen to transfer all or a portion of the payment amount for the purchased product from the first payment account to the alternate payment account; and submitting, by the processor, the completed payment transaction to the different transaction processing server to charge the alternative payment account for all or a portion of the payment amount for the purchased product.

9. The computerized method of claim 8, wherein detecting comprises detecting, by the processor, the completed payment transaction processed in relation to the first payment account or the second payment account outside the interactive GUI portal.

10. The computerized method of claim 8, wherein the benefit information associated with the second payment account comprises benefit information associated with a tax-advantaged financial account.

11. The computerized method of claim 8, further comprising determining, by the processor, a maximum benefit amount of the completed payment transaction.

12. The computerized method of claim 8, further comprising crediting, by the processor, all or a portion of the purchase amount of the purchased product to the first payment account.

13. The computerized method of claim 8, further comprising providing, by the processor to the interactive GUI portal of the mobile device, a historical payment screen of the second payment account in response to receiving a selection of the second payment account on the unified GUI screen on the mobile device.

14. The computerized method of claim 8, wherein the alternative payment account comprises a tax-advantaged financial account.

15. A non-transitory computer readable medium stored thereon computer-executable instructions embodied in a software product executed by a processor of an transaction processing server, wherein the computer-executable instructions comprising:

providing an interactive graphical user interface (GUI) to be displayed on a mobile device;

receiving, from the interactive GUI of the mobile device, a first input of a first payment account, said first input comprising one of the following: information on the transaction processing server associated with the first payment account, an account number of the first payment account, and a card type of the first payment account;

retrieving parameters associated with the first payment account, said parameters comprising at least one of the following: an account balance, a payment due date, and a payment rule;

receiving, from the interactive GUI of the mobile device, a second input of a second payment account, said second input comprising information on a second transaction processing server managing the second payment account, and at least one of an account number of the second payment account, and a card type of the second payment account, and benefit information associated with the second payment account, wherein the first payment account comprises a first tax-advantaged benefit payment account, wherein the second payment account comprises a second tax-advantaged benefit payment account, wherein the first and second tax-advantaged benefit payment accounts each comprises at least one of a flexible spending account (FSA), a health savings account (HSA), and a health reimbursement account (HRA);

connecting with the second transaction processing server and retrieving parameters associated with the second payment account, said parameters comprising a payment rule associated with the second payment account and at least one of the following: an account balance, a payment due date, and a benefit balance of the benefit information;

wherein the first payment account is different from the second payment account;

aggregating the parameters of the first payment account and the parameters of the second payment account;

providing, to the interactive GUI of the mobile device, a unified GUI screen displaying the aggregated parameters of the first payment account and the parameters of the second payment account, wherein the unified GUI screen provides the parameters of the first payment account in a first display region and provides the parameters, including the benefit balance, of the second payment account, in a second display region;

monitoring transactions of the first payment account and transactions of the second payment account;

identifying a particular completed transaction of the monitored transactions of the first payment account in response to the particular completed transaction associating with one of the parameters of the second payment account;

identifying, without additional input from the user, automatically, a purchased product and purchase amount in the completed payment transaction that meets the payment rule of the second payment account and maximizes the benefit balance of the second payment account based on descriptions of the purchased product;

providing, to the interactive GUI of the mobile device, a post-payment GUI screen that includes a textual message indicating to the user that the purchased product meets the payment rule of the second payment account and asking the user if they would like to transfer all or a portion of the payment amount for the purchased product from the first payment account to the second payment account;

receiving, from the interactive GUI of the mobile device, a confirmation selection by the user from the post-payment GUI screen to transfer all or a portion of the payment amount for the purchased product from the first payment account to the second payment account from the mobile device to process the payment order and the payment amounts;

providing, to the interactive GUI of the mobile device, a confirmation GUI screen that displays to the user on the interactive GUI portal all or a portion of the payment amount to be credited to the first payment account and all or a portion of the payment amount that is to be deducted from the second payment account;

receiving, from the interactive GUI of the mobile device, a confirmation from the user via the confirmation GUI screen to transfer all or a portion of the payment amount for the purchased product from the first payment account to the second payment account; and providing, to the second transaction processing server, the particular completed transaction for processing using the second payment account to modify the completed payment transaction.

16. The non-transitory computer readable medium of claim 15, wherein identifying comprises identifying the particular completed transaction of the monitored transactions of the first payment account in response to the particular completed transaction associating with one of the parameters of the second payment account during checkout.

17. The non-transitory computer readable medium of claim 15, wherein identifying comprises identifying the particular completed transaction of the monitored transactions of the first payment account in response to the particular completed transaction associating with one of the parameters of the second payment account after checkout.

18. The non-transitory computer readable medium of claim 15, further comprising providing a management GUI for managing information about the first payment account and the second payment account.

19. The computer readable medium of claim 15, further comprising connecting with the second transaction processing server via an application programming interface (API).

20. The computer readable medium of claim 15, wherein monitoring comprises monitoring one of the following of the transactions of the first payment account and the transactions of the second payment account: SMS messages, email messages, and notifications from the mobile device.

* * * * *